United States Patent [19]

Kraft

[11] Patent Number: 5,315,654
[45] Date of Patent: May 24, 1994

[54] ARMORED TELEPHONE LINE PROTECTIVE SYSTEM

[76] Inventor: Carroll K. Kraft, 1999 Valencia Way, Clearwater, Fla. 34624

[21] Appl. No.: 984,321
[22] Filed: Dec. 2, 1992
[51] Int. Cl.$^5$ .............................................. H04M 1/00
[52] U.S. Cl. ..................................... 379/438; 379/437
[58] Field of Search ..................... 379/451, 437, 438; 340/541, 540, 571; 174/48; 324/110, 156; 361/356, 371

[56] References Cited

U.S. PATENT DOCUMENTS

| | | | |
|---|---|---|---|
| 3,588,866 | 6/1971 | Schlafly | 340/276 |
| 3,852,541 | 12/1974 | Altenberger | 379/33 |
| 3,868,080 | 2/1975 | Olson | 248/205.1 |
| 3,996,415 | 12/1976 | Provorse | 174/48 |
| 4,246,451 | 1/1981 | Nix | 379/451 |
| 4,673,771 | 6/1987 | Grant | 174/38 |
| 4,731,819 | 3/1988 | Kalfon | 379/143 |
| 5,018,185 | 5/1991 | Riddle | 379/145 |

Primary Examiner—James L. Dwyer
Assistant Examiner—Jack Chiang
Attorney, Agent, or Firm—Pitts & Brittian

[57] ABSTRACT

An armored protective system for telephone wires on the exterior of a building to prevent severing (cutting, breaking, etc.) of the wires by an intended intruder into the building. Standard telephone service components are covered with interlocking tamper-proof cover elements. These include, in the preferred embodiment, metallic protector channel members to cover otherwise exposed wires, and a protective cover on other telephone system components that overlap the protector channel members so as to eliminate points at which the telephone wires can be severed. The protective cover is provided with a self-contained alarm unit to emit an audible sound when the protective cover is disturbed from its fixed position on the building. Fastening elements for attaching the components to a building wall are of the type that require specialized tools.

17 Claims, 3 Drawing Sheets

ARMORED TELEPHONE LINE PROTECTIVE SYSTEM

DESCRIPTION

1. Technical Field

The present invention relates generally to protective covering devices, and more particularly to a system to prevent both accidental and intentional damage to telephone lines entering a building.

2. Background Art

In private homes, and small businesses, the telephone line typically comes from the telephone system either underground or overhead to the building. In either type of installation, the wire is attached to the exterior of the building. Typically, there is a junction block positioned on the exterior wall a few feet from ground level where the telephone utility wires join those for the interior distribution, with this block having a weather resistant cover. If the telephone service comes from underground the wire is attached to the wall as it is led up the wall to this block. For overhead service, the lead-in line is attached to the wall as it comes down the wall to the block. The line(s) for the building phones either go through the building wall at that point, or are routed along the exterior of the building to various rooms or areas within the building.

One typical modus operandi (MO) of intruders, thieves, attackers and the like is that of severing or pulling loose telephone lines from the junction block of the building to be entered. The action prevents any outgoing 911 emergency telephone calls, either by occupants of the building or by security systems that send alarm signals via the telephone system. The intruder can then enter the building with the only deterrent being an intrusion alarm system that does not rely upon the telephone system. This MO is used frequently for thieves and rapists throughout the world.

Some systems have been developed to prevent accidental damage to telephone lines entering a building. One such system is that described for underground telephone service in U.S. Pat. No. 3,868,080 issued to J. B. Olson on Feb. 25, 1975. A channel-shaped stake is adapted to be driven into the ground adjacent the incoming wire and fastened to the surface of the building. A plate secured to the upper end of the stake is provided for the attachment of a conventional circuit junction box within a weather resistant cover. While the incoming telephone wire is protected within the confines of the channel portion, the line is exposed in the region of transition from the channel to the junction box. Thus, the only protection afforded by that system is against accidental contact with grass cutting devices and the like. An intruder has no constraint against cutting or pulling loose the telephone line.

Other references dealing with security systems, and particularly the safety of telephone systems, are U.S. Pat. Nos. 3,588,866 issued to H. J. Schlafly on Jun. 28, 1971; and 3,852,541 issued to E. C. Altenberger on Dec. 3, 1974. The '866 patent relates to an alarm that sounds if a cover of a building intrusion security system is opened by an unauthorized person. One of the alarms is transmitted via the telephone system. If, however, the telephone wire is cut or otherwise disabled, no outgoing signal is possible. The '541 patent teaches an alarm system that is sounded if the telephone line is cut: the building occupant is still without means to call for help.

Additional references that may be pertinent to an evaluation of the present invention are U.S. Pat. Nos. 4,246,451 issued to W. E. Nix on Jan. 20, 1981; 4,673,771 issued to M. L. Grant on Jun. 16, 1987; and 5,018,185 issued to R. Riddle on May 21, 1991.

Accordingly, it is an object of the present invention to provide an armored protective system to substantially prevent either accidental or intentional cutting of telephone lines entering a building.

It is another object of the present invention to provide a metallic channel to completely enclose any telephone lines attached to the exterior of a building together with a metallic cover for a telephone junction block, the cover mating with the channel to give complete protection to any telephone wires.

A further object of the present invention is to provide a metallic channel to completely enclose any telephone lines attached to the exterior of a building, a metallic cover for a telephone junction block that overlaps an end of the metallic channel, and an alarm for signalling a disturbance of the metallic cover, such that the potential for accidental and intentional severing of telephone lines is limited to aggressive methods and substantial burglary tools.

These and other objects of the present invention will become apparent upon a consideration of the following drawings and a complete description thereof.

DISCLOSURE OF THE INVENTION

In accordance with the present invention, there is provided a substantially non-destructive armored enclosure system to encase all portions of telephone service to a building where the telephone service wires are located where potential cutting or other separation could occur. This system includes channel-type protectors for encasing the otherwise exposed wires, with these protectors inter-connecting with cover elements for encasing other telephone system equipment. The cover elements are provided with alarm units to signal their disturbance. Since these components are difficult to remove or penetrate, a significant deterrent is provided against the disruption of telephone service to the interior of the building. Accordingly, any potential intruder will have difficulty in preventing outgoing calls from the building to 911 emergency offices either by the occupant(s) or a security system.

BEST MODE FOR CARRYING OUT THE INVENTION

Figure 1:
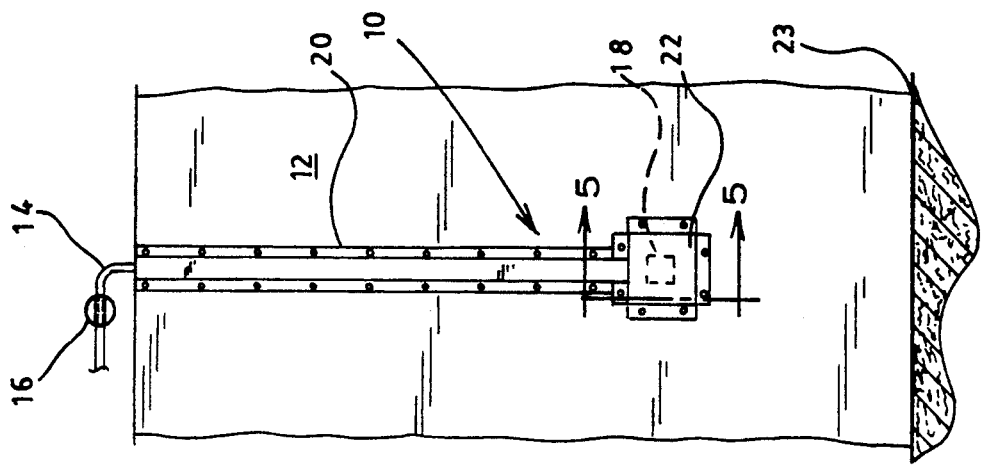
FIG. 1 is an elevational view, cut away, of a building wall illustrating the use of the present invention for protecting telephone lines derived from overhead service of a telephone utility.

Referring now to FIG. 1, the present invention is shown generally at 10 therein as attached to an exterior surface of a building wall 12. The particular installation illustrated is for a building where service of the telephone utility is via an overhead wire(s) 14. Such wire(s) 14 normally are held with an insulator 16 at a high elevation, with this wire then coming down to a terminal block 18. As part of the present invention, the portion of the wire coming to the block is enclosed in a channel-shaped protector 20 attached to the surface of the wall 12 so as to prevent easy removal. The protector channel 20 extends upwardly on the wall 12 to a height such as to deter access to the wire 14. A cover 22 is provided to encase the block 18, with this cover 22 mating with the protector channel 20 to fully protect the wire 14 against intentional cutting or other wire disengagement. As will be discussed hereinafter, there is an alarm mechanism associated with the cover 22 to produce an audible signal if the cover 22 is disturbed from its position.

Figure 2:
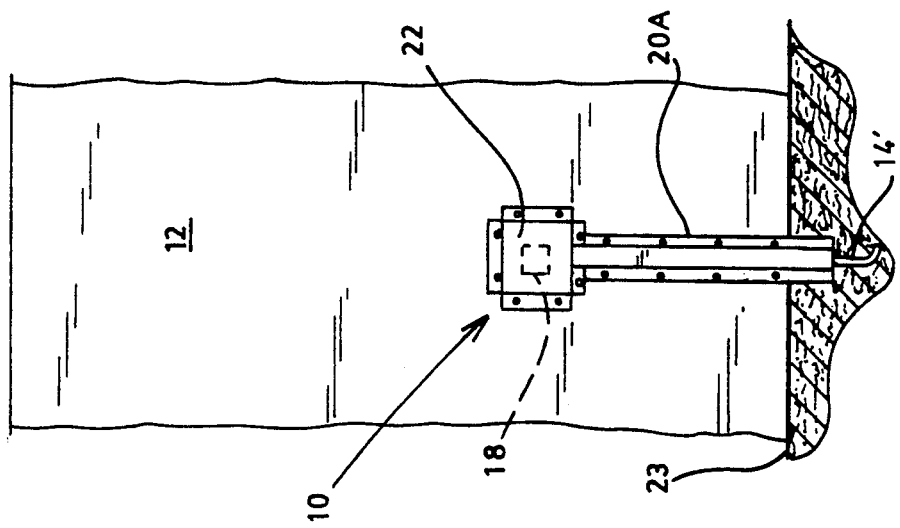
FIG. 2 is an elevational view, cut away, of a building wall illustrating the use of the present invention for protecting telephone lines from underground (subterranean cable) service lines of a telephone utility.

FIG. 2 depicts a similar structure of a protective system as that illustrated in FIG. 1. All elements are inverted so as to protect the incoming wire 14' that comes from subterranean lines. Thus, the protector channel 20A extends downwardly on the wall 12 and into the ground 23 a sufficient distance to deter cutting of the wire 14'. In a similar manner, the cover 22 protects any junction block 18 on the building, and the cover 22 is provided with the same type of alarm device. In the installation of FIG. 2, and that of FIG. 1, it is assumed that interior telephone wires enter the building at the point of the junction block 18.

Figure 3:
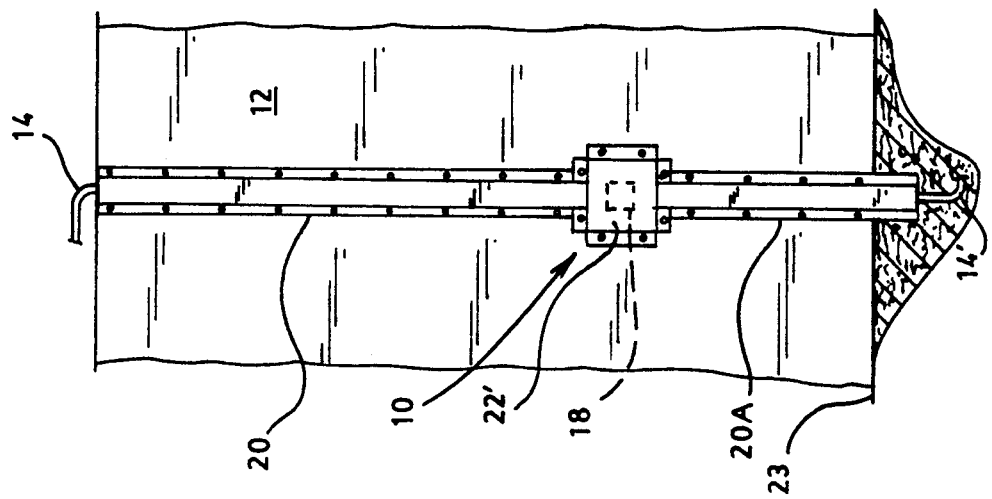
FIG. 3 is an elevational view, cut away, of a building wall illustrating the use of the present invention for protecting telephone lines that extend above and below a junction box of telephone service of a telephone utility.

Many telephone installations involve wires directed in both upward and downward directions from the junction block. This type of installation is illustrated in FIG. 3. In this installation, there is a protector channel 20 directed upwardly, and a protector channel 20A directed downwardly. For this installation, the cover 22' provides for coupling with both of the protector channels 20, 20A. This installation might be one for underground service (through protector channel 20A) with distribution to rooms of the building through wires within protector channel 20.

Figure 4:
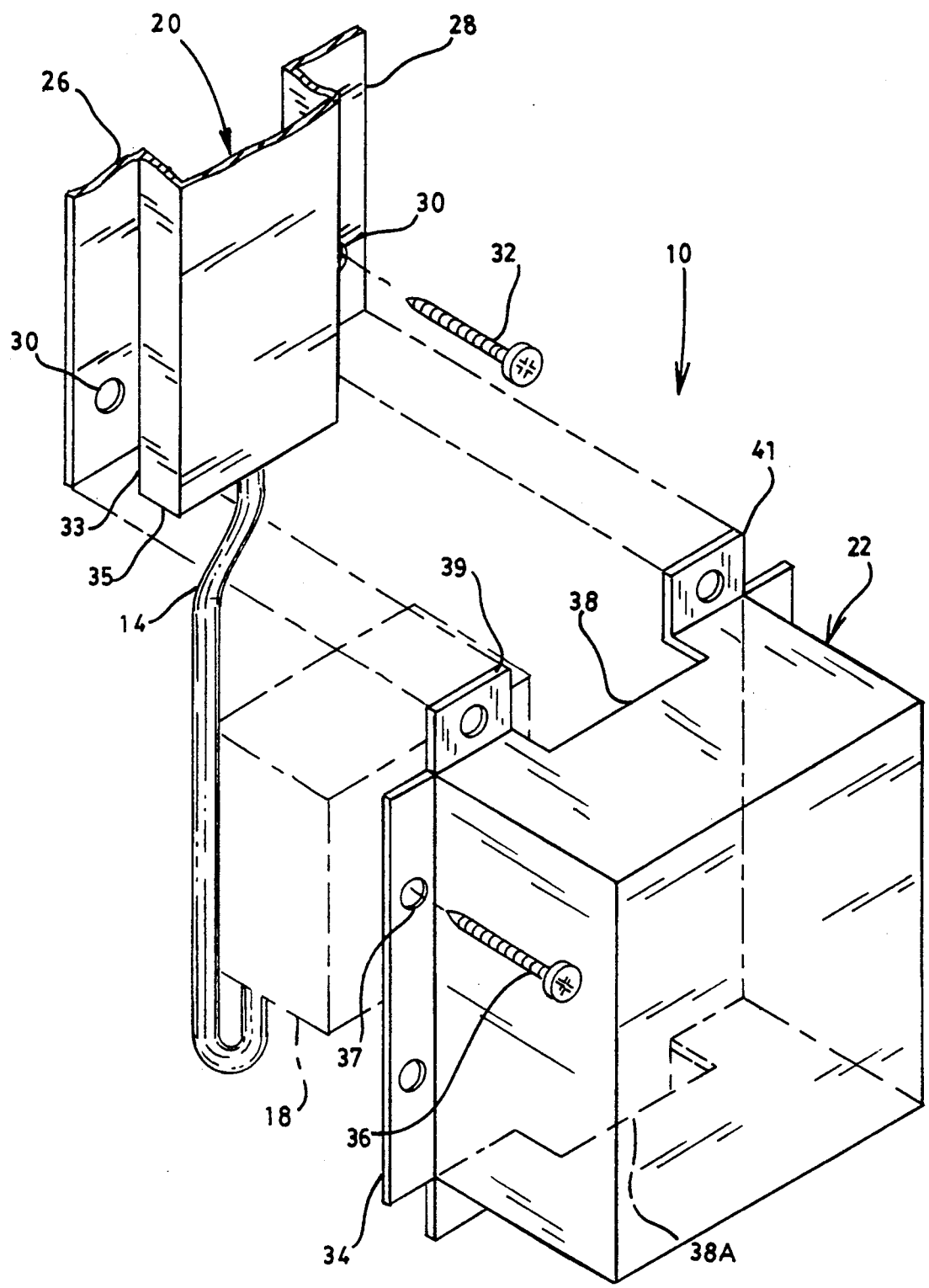
FIG. 4 is a drawing showing particulars of channel protectors for telephone wires extending along an exterior surface of a building, and mating covers for any devices of the telephone utility that are attached to the exterior surface of the building.

Details of the protector channel 20 and the cover 22, and their interconnection, can be seen in FIG. 4. In the embodiment illustrated, the protector channel 20 defines a rectangular interior for encasing a telephone wire 14 (or 14'). It will be understood that the protector channel 20 could have other cross-sections. Oppositely disposed flanges 26, 28 are provided along the length of the protective channel 20 with spaced openings 30 to accept suitable fasteners 32 therethrough for the purpose of attaching the protector channel 20 to a selected building surface. In a preferred embodiment, a portion of the flanges 26, 28 of the protector channel 20 are removed, as at 33, so as to permit a terminal end 35 of the protector channel 20 to project.

A protective cover is shown for encasing the junction box with its enclosure 18. The protective cover 22 is shown as defining a rectangular volume; however, other configurations can be utilized. Peripheral edges of the cover 22 are provided with flanges, e.g., 34, with these flanges having spaced openings 37 to accept suitable fasteners 36 therethrough. The fasteners 32 and 36 are of the type known in the art that can be readily inserted into the wall structure and removed by authorized personnel but are fabricated to prevent easy removal without a specialized tool. The cover 22 is provided with a notch 38 that is formed to closely receive the exterior contour of the protector channel 20 and accept the terminal end 35 thereof. The "ears" 39, 41 of the flange 34 cut by the notch 38 are designed to fit the space where the flanges 26, 28 of the protector channel 20 are cut away at 33. Further, if the cover 22 is to be used with additional protector channels (e.g., 20A as in FIG. 3), there can be a notch 38A (or a plurality of notches) provided in the edge of the cover 22 to closely receive the contour and terminal end of that additional protector channel. This notch 38A can either be provided by a cut-away portion or by a "knock-out" portion. If a cover 22 is initially provided with more than one notch (e.g., also with a notch 38A) and a lesser number is needed, an L-shaped cover element 43 (see FIG. 5) can be used for any unused notch to prevent access to the interior of the cover 22. One leg of this cover element 43 would be clamped between a flange 34 of the cover 22 and the exterior surface 12 of the building.

Figure 5:
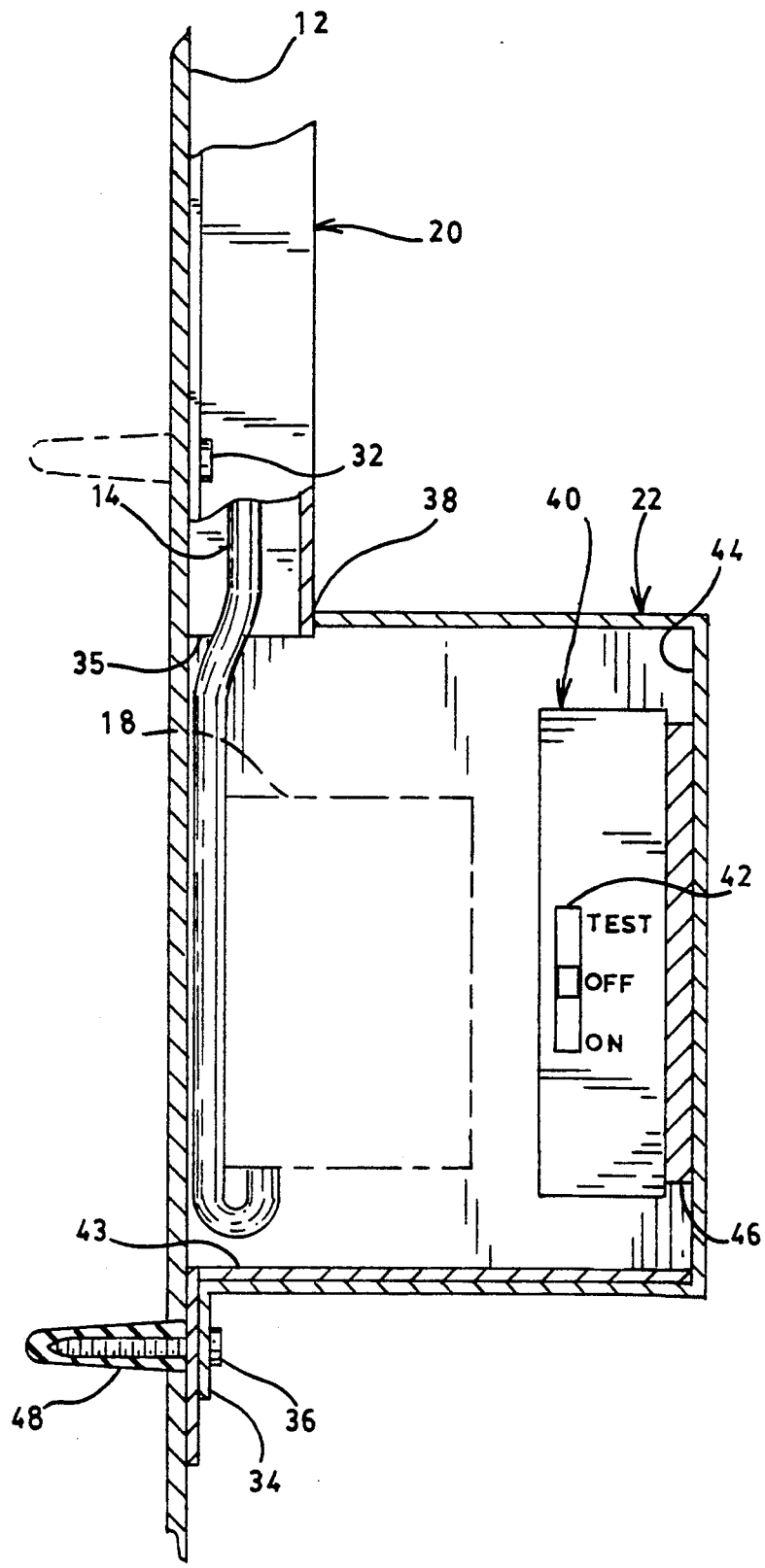
FIG. 5 is a cross-sectional view of the components of FIG. 4 taken at 5—5 of FIG. 1.

As discussed above, the cover 22 is provided with a alarm 40 that will sound if the cover 22 is disturbed, for example, by being removed from the building wall 12. This construction is shown in the cross-sectional view of FIG. 5. In a preferred embodiment, this alarm 40 is a self-contained motion sensor type alarm powered by an internal battery (not shown) such as used in smoke alarms. The unit can be, for example, an alarm available from Radio Shack, Model No. 49-550 which has a short time delay (e.g., about twenty seconds) to permit arming of the alarm by authorized personnel. The alarm unit has a switch 42 that permits testing the unit, turning the unit "ON" and "OFF". Preferably, the alarm unit 40 is attached to the interior surface 44 of the cover 22 using a magnetic strip 46 that is cemented to the back of the alarm unit. In this manner, the alarm unit 40 can be removed from the cover 22 to more easily operate the switch 42 by authorized personnel. This FIG. 5 depicts a typical type of anchor 48 inserted in the exterior wall 12 for holding the fasteners 32, 36.

The protector channel(s) 20 and the cover 22 are typically fabricated from steel to resist penetration by ordinary tools carried by a potential intruder. They can be galvanized and/or painted to resist attack by the weather. However, they can be made from any suitable material that resists penetration, e.g., tough plastics.

In a typical installation, channel protector units are installed to encase all telephone wires that would be accessible to a potential intruder, with the ends thereof coming in sufficient proximity so as to be covered by the cover 22. As stated above, fasteners 32 that restrict their removal would be utilized to attach the protector channel(s) 20 to the building wall 12. After testing the alarm unit 40, by using the switch 42, the alarm unit is attached to the inner surface 44 of the cover 22 using the magnetic strip 46. The switch 42 is then moved to the "ON" position, and the cover 22 attached to the wall surface 12 in a position so as to encase the open ends of the protector channel(s) 20. In this condition, any wire encased by the protector channel(s) 20 and cover 22 are protected against intentional severing or other disruption by a potential intruder.

From the foregoing it will be understood that an armored protective system has been provided to substantially prevent the cutting or otherwise disrupting of telephone wires entering a building. This includes both accidental cutting as well as intentional cutting or pulling loose by a potential intruder. If the cover portion is disturbed so as to gain access to wires, a self-contained alarm will be sounded to warn of such disturbance. Accordingly, persons within the building will have available telephone lines to signal security personnel or alert a 911 emergency office that an intruder is attempting entry into the premises.

In order to describe a best mode for the present invention, certain specific materials are cited. However, these are not cited as a limitation of the invention. Rather, the invention is to be limited only by the appended claims or their equivalents.

I claim:

1. An armored protective system to cover telephone wires and equipment installed on an exterior of a building to prevent severing the wires and tampering with the equipment by an intended intruder into the building, said system comprising:
   an elongated armor protector channel for covering the telephone wires, said protector channel being open toward the exterior of the building and having oppositely disposed edge flanges provided with openings to receive fastener means for attaching said protector channel to the exterior of the building, said protector channel preventing severing of the wires;
   an armor enclosure for covering the telephone equipment, said enclosure receiving a terminal end of said protector channel, said enclosure being open toward the exterior of the building and having outwardly extending flanges provided with openings to receive fastener means for attaching said enclosure to the exterior of the building, said enclosure preventing tampering with the telephone equipment, said enclosure being provided with an edge notch to closely receive said terminal end of said protector channel; and
   a self-contained motion-sensitive alarm means mounted within said enclosure, said alarm means providing an audible sound when said enclosure is disturbed on the exterior of the building.

2. The system of claim 1 wherein said enclosure is provided with at least a second edge notch to closely receive a terminal end of a further protector channel.

3. The system of claim 1 wherein said protector channel and said enclosure are fabricated from steel to resist penetration.

4. The system of claim 1 wherein said protector channel and said enclosure define rectangular interior volumes.

5. The system of claim 1 wherein said alarm means is powered with an internal battery.

6. The system of claim 3 wherein said alarm means is releasably attached within said enclosure.

7. The system of claim 6 wherein said alarm means is provided with an attached magnetic means, said magnetic means being in contact with an internal surface of said enclosure.

8. The system of claim 1 wherein said alarm means is provided with a switch having an "ON" position, an "OFF" position, and a "TEST" position.

9. The system of claim 1 wherein said fastener means are tamper-proof fasteners passing through openings in said protector channel flanges and said enclosure flanges for attaching said protector channel and said enclosure to the exterior of the building.

10. An armored protective system to cover telephone wires and equipment installed on an exterior of a building to prevent severing the wires and tampering with the equipment by an intended intruder into the building, said system comprising:
    an elongated steel protector channel for covering the telephone wires, said protector channel being open toward the exterior of the building and defining a rectangular cross section, said protector channel having oppositely disposed edge flanges provided with openings to receive fastener means for attaching said protector channel to the exterior of the building, said protector channel preventing severing of the wires;
    a steel enclosure for covering the telephone equipment, said enclosure being open toward the exterior of the building and defining a rectangular cross section, said enclosure provided with a notch in an edge for receiving a terminal end of said protector channel, said enclosure having outwardly extending edge flanges provided with openings to receive fastener means for attaching said enclosure to the exterior of the building, said enclosure preventing tampering with the telephone equipment; and
    a self-contained motion-sensitive alarm means releasably mounted within said enclosure, said alarm means providing an audible sound when said enclosure is disturbed on the exterior of the building.

11. The system of claim 10 wherein said enclosure is provided with at least a second edge notch to closely receive a terminal end of a further protector channel to be attached to the exterior of the building to cover additional of the wires.

12. The system of claim 10 wherein said alarm means is a motion sensor type alarm powered with an internal battery, said alarm means being provided with a switch having an "On" position, an "OFF" position, and a "TEST" position.

13. The system of claim 10 wherein said alarm means is provided with an attached magnetic means, said magnetic means being in contact with an internal surface of said enclosure.

14. The system of claim 11 wherein said at least one second edge notch is provided with a removable cover element to cover said at least one second edge notch when not utilized to engage said further protector channel and thereby prevent access into said enclosure.

15. The system of claim 10 wherein said fastener means are tamper-proof fasteners passing through said openings in said protector channel flanges and said enclosure flanges for attaching said protector channel and said enclosure to the exterior of the building.

16. An armored protective system for covering telephone wires and equipment installed on an exterior of a building to prevent severing the wires and tampering with the equipment by an intended intruder into the building, said system comprising:
    an elongated steel protector channel defining a rectangular interior volume open toward the exterior of the building for covering the telephone wires, said protector channel having oppositely disposed edge flanges provided with openings to receive fastener means for attaching said protector channel to the exterior of the building, said protector channel preventing severing of the wires;
    a steel enclosure defining a rectangular interior volume open toward the exterior of the building for covering the telephone equipment, said enclosure provided with a notch in an edge for receiving a terminal end of said protector channel, said enclosure having outwardly extending edge flanges provided with openings to receive fastener means for attaching said enclosure to the exterior of the building, said enclosure preventing tampering with the telephone equipment;

a self-contained motion detector alarm means releasably mounted with a magnet within said enclosure, said alarm means providing an audible sound when said enclosure is disturbed on the exterior of the building; and said fastener means are tamper-proof fasteners for passing through said openings in said protector channel flanges and said enclosure flanges for attaching said protector channel and said enclosure to the exterior of the building.

17. The system of claim 16 wherein said steel enclosure is provided with at least a second edge notch to receive a terminal end of a further protector channel to be fastened to the exterior of the building to cover additional of the wires, and with a cover element for said second edge notch when said second edge notch is not engaged with said further protector channel and thereby prevent access into said steel enclosure through said second edge notch.

* * * * *